United States Patent
Kamdar et al.

(10) Patent No.: US 8,078,203 B2
(45) Date of Patent: Dec. 13, 2011

(54) INTELLIGENT MESSAGING SERVICE

(75) Inventors: Kashyap Kamdar, Palatine, IL (US); Bertrand K. Fondjo, Lake In The Hills, IL (US); Tushar Raval, Vernon Hills, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 819 days.

(21) Appl. No.: 11/870,430

(22) Filed: Oct. 11, 2007

(65) Prior Publication Data
US 2009/0098859 A1 Apr. 16, 2009

(51) Int. Cl.
*H04W 4/00* (2009.01)
*H04M 1/725* (2006.01)

(52) U.S. Cl. .................. 455/466; 455/412.1; 455/412.2

(58) Field of Classification Search ............... 455/466, 455/517–518, 418–420, 566, 412.1–412.2, 455/414.1–414.3, 456.1–456.6
See application file for complete search history.

(56) References Cited

U.S. PATENT DOCUMENTS

| | | | |
|---|---|---|---|
| 6,430,604 B1 * | 8/2002 | Ogle et al. | 709/207 |
| 6,542,750 B2 * | 4/2003 | Hendrey et al. | 455/456.1 |
| 6,993,363 B1 * | 1/2006 | Hsu | 455/567 |
| 6,999,566 B1 * | 2/2006 | Eason et al. | 379/88.22 |
| 7,171,190 B2 | 1/2007 | Ye et al. | |
| 7,181,217 B2 | 2/2007 | Kalavade | |
| 7,359,724 B2 * | 4/2008 | Torvinen | 455/518 |
| 7,596,210 B2 * | 9/2009 | Blohm | 379/88.22 |
| 2003/0004776 A1 * | 1/2003 | Perrella et al. | 705/9 |
| 2004/0087300 A1 * | 5/2004 | Lewis | 455/412.2 |
| 2004/0193689 A1 * | 9/2004 | Vasquez | 709/206 |
| 2004/0219936 A1 * | 11/2004 | Kontiainen | 455/466 |
| 2005/0085239 A1 | 4/2005 | Cedervall | |
| 2005/0143097 A1 * | 6/2005 | Wilson et al. | 455/456.3 |
| 2005/0221807 A1 * | 10/2005 | Karlsson et al. | 455/418 |
| 2006/0194596 A1 * | 8/2006 | Deng | 455/466 |
| 2006/0240851 A1 * | 10/2006 | Washburn | 455/466 |

FOREIGN PATENT DOCUMENTS

| | | |
|---|---|---|
| EP | 1389022 A1 | 2/2004 |
| EP | 1564944 B1 | 12/2006 |
| EP | 1802145 A1 | 6/2007 |
| JP | 2004048461 | 2/2004 |
| JP | 2006041697 | 2/2006 |
| WO | 2006005122 A1 | 1/2006 |
| WO | 2006018794 A1 | 2/2006 |

OTHER PUBLICATIONS

Yeo, Won Hyeon: The International Search Report and The Written Opinion of the International Searching Authority, or the Declaration, ISA/KR, Republic of Korea, completed Apr. 8, 2009, mailed Apr. 8, 2009, all pages.

* cited by examiner

*Primary Examiner* — Brandon Miller (57) ABSTRACT

A method, information processing system, and wireless communication system, that provide wireless messaging services to wireless devices. A wireless messaging request is received from a user of at least one wireless device (104). The wireless messaging request is associated with at least one recipient device. The wireless messaging request is analyzed in response to receiving the request. The wireless messaging request is determined to include at least one of recipient filtering criteria (206) and delivery criteria (208) in response to the analyzing. A wireless message associated with the wireless messaging request is transmitted to the at least one wireless device based on the at least one of recipient filtering criteria (206) and delivery criteria (208).

7 Claims, 6 Drawing Sheets

INTELLIGENT MESSAGING SERVICE

FIELD OF THE INVENTION

The present invention generally relates to the field of wireless communications, and more particularly relates to intelligent messaging utilizing various filtering and delivery mechanisms.

BACKGROUND OF THE INVENTION

Wireless messaging technology has evolved greatly over the recent years. Currently, wireless messages can be sent via mobile phones, computers, watches, and many various wireless communication devices. Wireless messages can include text, audio, video, and any combination thereof. One problem with current wireless messaging systems is that a user is not provided customizable and intelligent delivery mechanisms. For example, a user is currently limited to sending wireless messages to groups of users whether or not the users are available to receive the messages. Also, if a user wants to send invites to a group of individuals, every individual in the group receives the invite even though one or more individuals are unavailable to participate. Furthermore, current wireless messaging systems do not provide a way for users to deliver messages to recipients based on the recipients' location.

Therefore a need exists to overcome the problems with the prior art as discussed above.

SUMMARY OF THE INVENTION

Briefly, in accordance with the present invention, disclosed are a method, information processing system, and wireless communication system for providing wireless messaging services to wireless devices. A wireless messaging request is received from at least one wireless device. The wireless messaging request is associated with at least one recipient device. The wireless messaging request is analyzed in response to receiving the request. The wireless messaging request is determined to include at least one of recipient filtering criteria and delivery criteria in response to the analyzing. A wireless message associated with the wireless messaging request is transmitted to the at least one wireless device based on the at least one of recipient filtering criteria and delivery criteria.

In another embodiment, an information processing system for providing wireless messaging services to wireless devices is disclosed. The information processing system includes a memory and a processor that is communicatively coupled to the memory. The information processing system also includes a wireless message manager that is communicatively coupled to the memory and the processor. The wireless message manager is adapted to receiving a wireless messaging request from at least one wireless device. The wireless messaging request is associated with at least one recipient device. The wireless messaging request is analyzed in response to receiving the request. The wireless messaging request is determined to include at least one of recipient filtering criteria and delivery criteria in response to the analyzing. A wireless message associated with the wireless messaging request is transmitted to the at least one wireless device based on the at least one of recipient filtering criteria and delivery criteria.

In yet another embodiment, a wireless communication system is disclosed. The wireless communication system includes a plurality of base stations and a plurality of wireless devices. Each wireless device is communicatively coupled to at least one base station in the plurality of base stations. The wireless communication system also includes at least one information processing system that is communicatively coupled to at least one base station in the plurality of base stations. The information processing system also includes a wireless message manager that is communicatively coupled to the memory and the processor. The wireless message manager is adapted to receiving a wireless messaging request from at least one wireless device. The wireless messaging request is associated with at least one recipient device. The wireless messaging request is analyzed in response to receiving the request. The wireless messaging request is determined to include at least one of recipient filtering criteria and delivery criteria in response to the analyzing. A wireless message associated with the wireless messaging request is transmitted to the at least one wireless device based on the at least one of recipient filtering criteria and delivery criteria.

An advantage of the foregoing embodiments of the present invention is that a user can perform customizable group communication via messaging over a wireless network. Another advantage of the present invention is that recipient filter criteria and delivery criteria can be defined by a user and associated with wireless messages.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, automotive gateway, and a residential gateway.

Wireless Communication System

Figure 1:
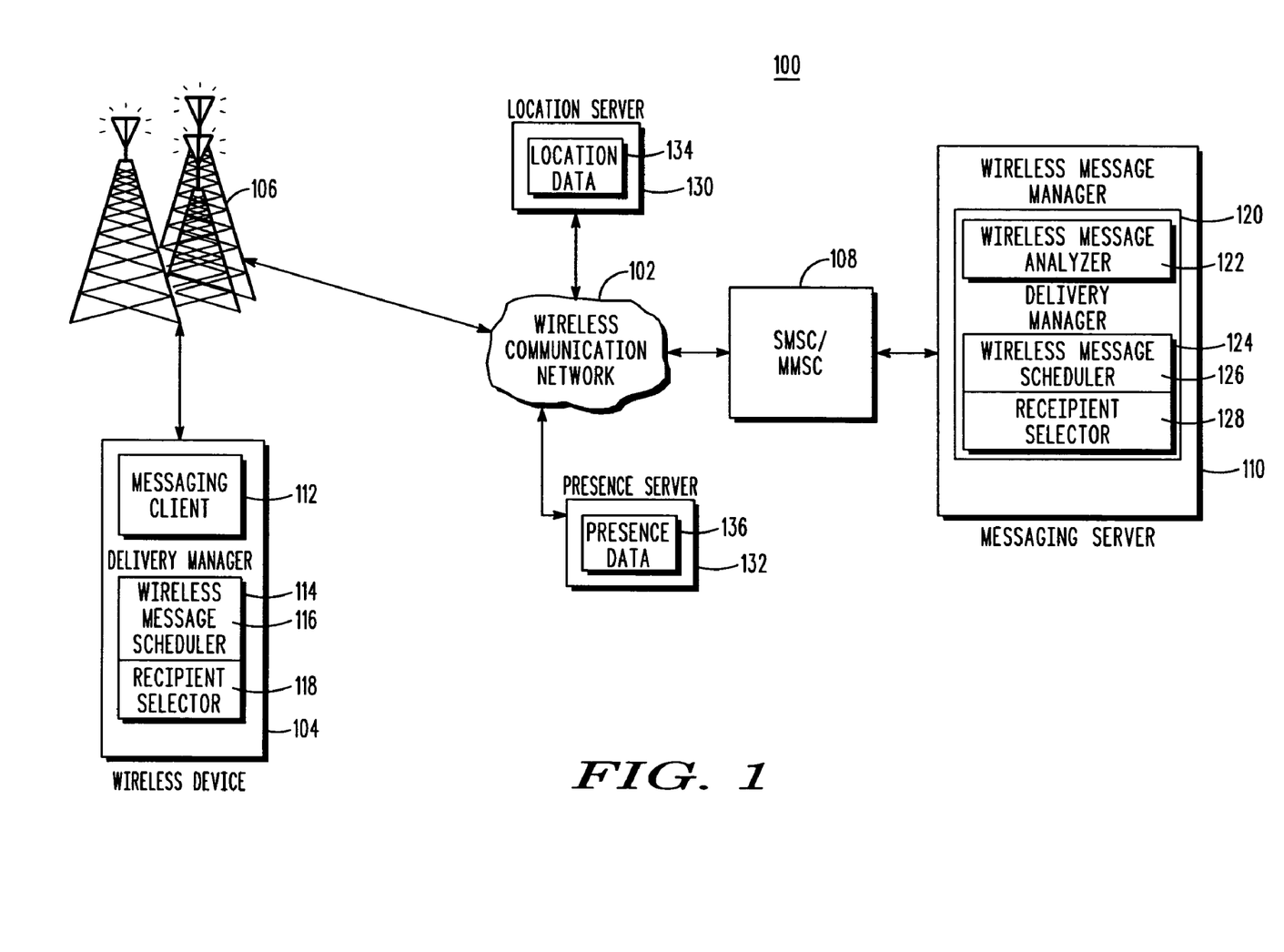
FIG. 1 is block diagram illustrating a wireless communication system, according to an embodiment of the present invention.

According to one embodiment of the present invention, FIG. 1 illustrates an example of a wireless communication system 100. FIG. 1 specifically shows a wireless communication network 102 that can comprise one or more access networks such as a packet data network (not shown) and/or a circuit services network (not shown). In one embodiment, the packet data network is an IP or SIP based connectivity network, which provides data connections at much higher transfer rates than a traditional circuit services network. A packet data network can comprise an Evolution Data Only ("EV-DO") network, a General Packet Radio Service ("GPRS") network, a Universal Mobile Telecommunications System ("UMTS") network, an 802.11 network, an 802.16 ("WiMax") network, Ethernet connectivity, dial-up modem connectivity, or the like. A circuit services network provides, among other things, voice services to the wireless device. It should be noted that access networks also include additional components (not shown) such as controllers, transport/interconnect gear, network management modules, and other network components that should be known to those of ordinary skill in the art.

The communications standard of the wireless communication network 102 can comprise Code Division Multiple Access ("CDMA"), Time Division Multiple Access ("TDMA"), Global System for Mobile Communications ("GSM"), General Packet Radio Service ("GPRS"), Frequency Division Multiple Access ("FDMA"), other IEEE 802.16 standards, Orthogonal Frequency Division Multiplexing ("OFDM"), Orthogonal Frequency Division Multiple Access ("OFDMA"), Wireless LAN ("WLAN"), WiMax or the like. Other applicable communications standards include those used for Public Safety Communication Networks including Project 25 ("P25") or TErrestrial TRunked rAdio ("TETRA").

The wireless communication system 100 supports any number of wireless devices 104 which can be single mode or multi-mode devices. Multi-mode devices are capable of communicating over multiple access networks with varying technologies. For example, and not for limitation, a multi-mode device can communicate over the access networks 106 using various services such as Push-To-Talk ("PTT"), Push-To-Talk Over Cellular ("PoC"), multimedia messaging, web browsing, VoIP, and multimedia streaming.

The wireless communication system 100 also includes one or more base stations 106 that are communicatively coupled to the wireless communication network 102 and one or more wireless devices 104. An information processing system 108 comprising functionality similar to a Short Messaging Service Center ("SMSC") and/or a Multimedia Messaging Service Center ("MMSC") is communicatively coupled to the wireless communications network 102 and a messaging server 110. The information processing system 108 communicatively couples to the wireless devices 104 and to the messaging server 110 for utilizing wireless messaging services. The wireless devices 104, in one embodiment, comprise a wireless messaging client 112 for allowing a user to create and send wireless messages. The wireless device 104 also includes a delivery manager 114, which includes a wireless message scheduler 116 and a recipient selector 118. These components provide customizable and intelligent wireless messaging capabilities to a user and are discussed in greater detail below.

The messaging server 110 comprises a wireless message manager 120. The wireless message manager 120 includes a wireless message analyzer 122 and a delivery manager 124. The delivery manager 124 includes a wireless message scheduler 126 and a recipient selector 128. These components also provide customizable and intelligent wireless messaging capabilities to a user and are discussed in greater detail below.

The wireless communication system 100 includes one or more information processing systems 130, 132 communicatively coupled to the wireless communication network 102. For example, one information processing system 130 is a location server 130 that monitors the location of wireless devices 104 and comprises location data 134. Another information processing system 132 is a presence server 132 that monitors the availability of a wireless device 104 and comprises presence data 136. For example, a user can set a status at the wireless device such as available, busy, away, and other status. Also, presence can be determined based on the location of the wireless device and/or the current time. It should be noted that the location server 130 and the presence server 132 can be located at the same information processing system. Also, the messaging server 110 can alternatively comprise location and presence modules. The location and presence servers 130, 132 are discussed in greater detail below.

Customizable and Intelligent Wireless Messaging

Figure 2:
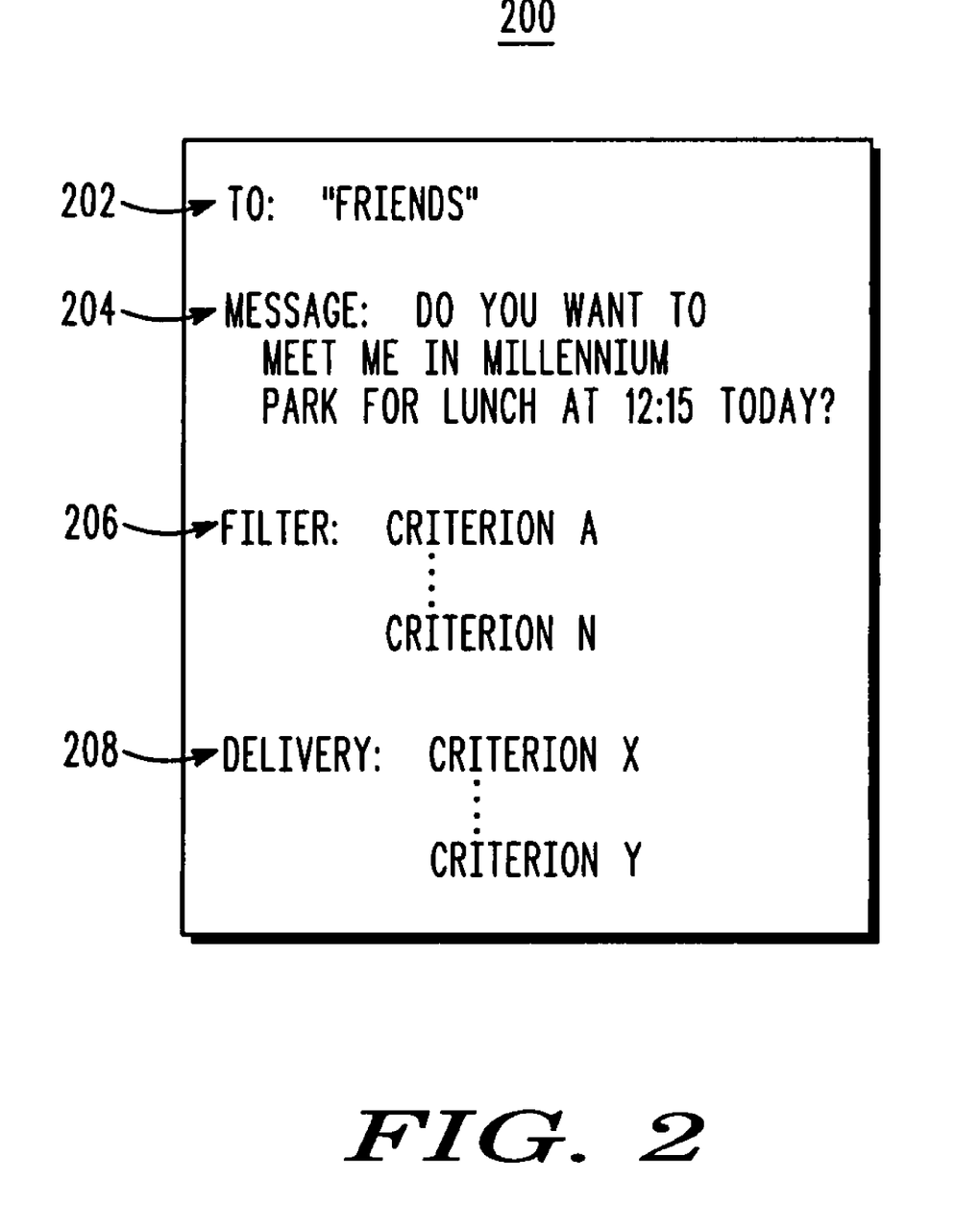
FIG. 2 is a block diagram illustrating one example of a wireless message according to an embodiment of the present invention.

This section discusses one example of the customizable and intelligent wireless messaging system according to one embodiment of the present invention. A user creates one or more wireless messages, such as through the messaging client 112 at the wireless device 104, or through another wireless message entry device. One advantage of the present invention is that a user can also select various filters and delivery criteria for a wireless message. For example, FIG. 2 shows an example of a wireless message 200. A user has selected a specific group, "Friends", as the intended recipients of the wireless message 200. The group "Friends" comprises two or more wireless device addresses/numbers that are associated with individuals designated by the user in his/her "Friends" group. It should be noted that a user can also create a message to be sent to a single recipient or add multiple address/numbers or groups in the "To:" field 202.

The wireless message 200 includes a "Message" section 204 which comprises the actual message, invitation, event, or the like that is to be sent to the recipient(s). For example, FIG. 2 shows a message of "Do you want to meet me in Millennium Park for lunch at 12:15 today?" This message can also be setup as a calendar invite or an event listing that when accepted by a recipient would update the appropriate application such as a calendar or a "To-Do" list. FIG. 2 also shows a "Filter" field 206 and a "Delivery" field 208. It should be noted that these fields are not limited to residing in the message form (e.g., the form used to create the message). For example, the filter and delivery options can reside in other menus within the messaging client 112.

The "Filter" field 206 allows a user to define filtering criteria for the recipients of the message 200. For example, a user can set the filter criteria to "any", which indicates to the messaging server 110 that the message is to be sent to all of the recipients listed in the message. The user can also indicate in the filter criteria that the message is to be sent to recipients that are "available" or "free". In this example, when the messaging server 110 receives the message 200, the recipient selector 128 determines which of the recipients are "available" and selects those recipients to send the message to. The messaging server 110 can determine the status of a recipient by querying the presence server 132 and receiving presence data 136.

A user can also select multiple status criteria such as "available" and "busy". In addition to presence criteria, a user can define location criteria in the filter field 206. For example, a user may want the message sent only to members in the "Friends" group that are within a certain distance from a location (e.g., Millennium Park in this example). The recipient selector 128 at the messaging server 110, in one embodiment, queries the location server 130 to determine which recipients are within a given distance to the specified location. The recipient selector 128 then selects recipients destined to receive the message 200 based on the indicated location criteria and any presence criteria defined by the sender. It should be noted that the filtering can be performed at the wireless device 104 as compared to the messaging server 110. In this example, the recipient selector 118 of the wireless device 104 selects recipients (as discussed above) out of the set of recipients defined by the sender. Therefore, when the message 200 is sent to the messaging server 110 the filtering of recipients has already been performed by the wireless device 104 itself.

FIG. 2 also shows a "Delivery" field 208 that allows a user to define delivery criteria for the message. The delivery criteria indicates to the messaging server 110 when to deliver the message 200 to a recipient. For example, and not for limitation, a user can define delivery criteria based on presence status of a recipient, on location status of a recipient, and on other criteria. The messaging server 110 analyzes the delivery criteria and the delivery manager 124 delivers the message 200 to the selected recipients based on the delivery criteria (and filter criteria if defined). As discussed above, the selected recipient or recipients are selected from the original recipient or recipients associated with the message 200 by the user based on the filter criteria.

One example of a presence status is "available". In this example, a user can define a delivery criterion that indicates the message 200 is to be delivered to any recipient(s) that has a presence status of "available". Therefore, the delivery manager 124 at the messaging server 110 delivers the message 200 to recipients selected based on the filter criteria when the presence status of the selected recipients is "available".

Additionally, the user can define location criteria that indicate to the messaging server 110 when to deliver the message 200 based on the location of a recipient. For example, a user can define a location delivery criterion that indicates that a message 200 is to be sent to a recipient when that recipient is near his/her home. In this example, the messaging server 110 analyzes the message and determines that location delivery criteria exist. The delivery manager 124 queues the message 200 to be sent when location information 134 indicates that the particular recipient is near his/her home. It should be noted that filtering based on delivery criteria can be performed at the wireless device 104 instead of the messaging server 110. For example, the wireless device 104 can query the presence and location servers 130, 132 to determine the status and location of selected recipients. When the presence and delivery criteria (if any are present) match, the wireless device 104 can transmit the message 200 to message server 110. The messaging server 110 then transmits the message 200 to the recipient(s).

As can be seen from the above examples, a user can customize message recipient groups based on various recipient filtering and message delivery criteria. A user can also select a single recipient, or one or more groups of recipients, to receive a message. The wireless device 104 and/or the messaging server 110 can select one or more recipients from the original set of recipients based on recipient filter criteria. Delivery of a message can also be customized by defining delivery criteria such as presence status of a recipient and location of the recipient.

In another embodiment, periodic or event-based notifications are provided to a wireless device 104 from the messaging server 110. For example, a user can be notified by the messaging server 110 when a recipient has received a message 200. If a message 200 is delayed until a filter or delivery criterion is met by a recipient, the messaging server 110 can also notify the wireless device 104 when the message 200 is sent. Also, as discussed above, the original set of recipients selected by a user may not be the final set of recipients. Therefore, the user can be notified of which original recipients have been sent the message 200. A user can also send a cancel notification to the messaging server 110 to cancel a sent message. If the message 200 is still pending at the messaging server 110, (e.g., the message 200 is to be sent when the recipient is near his/her home) the message 200 is cancelled and not sent. However, if a message 200 has already been sent and received by a recipient, the messaging server 110 can send a cancel notification to the recipient. This notification informs the recipient that the sender is canceling/recalling the received message 200.

Example of Wireless Device

Figure 3:
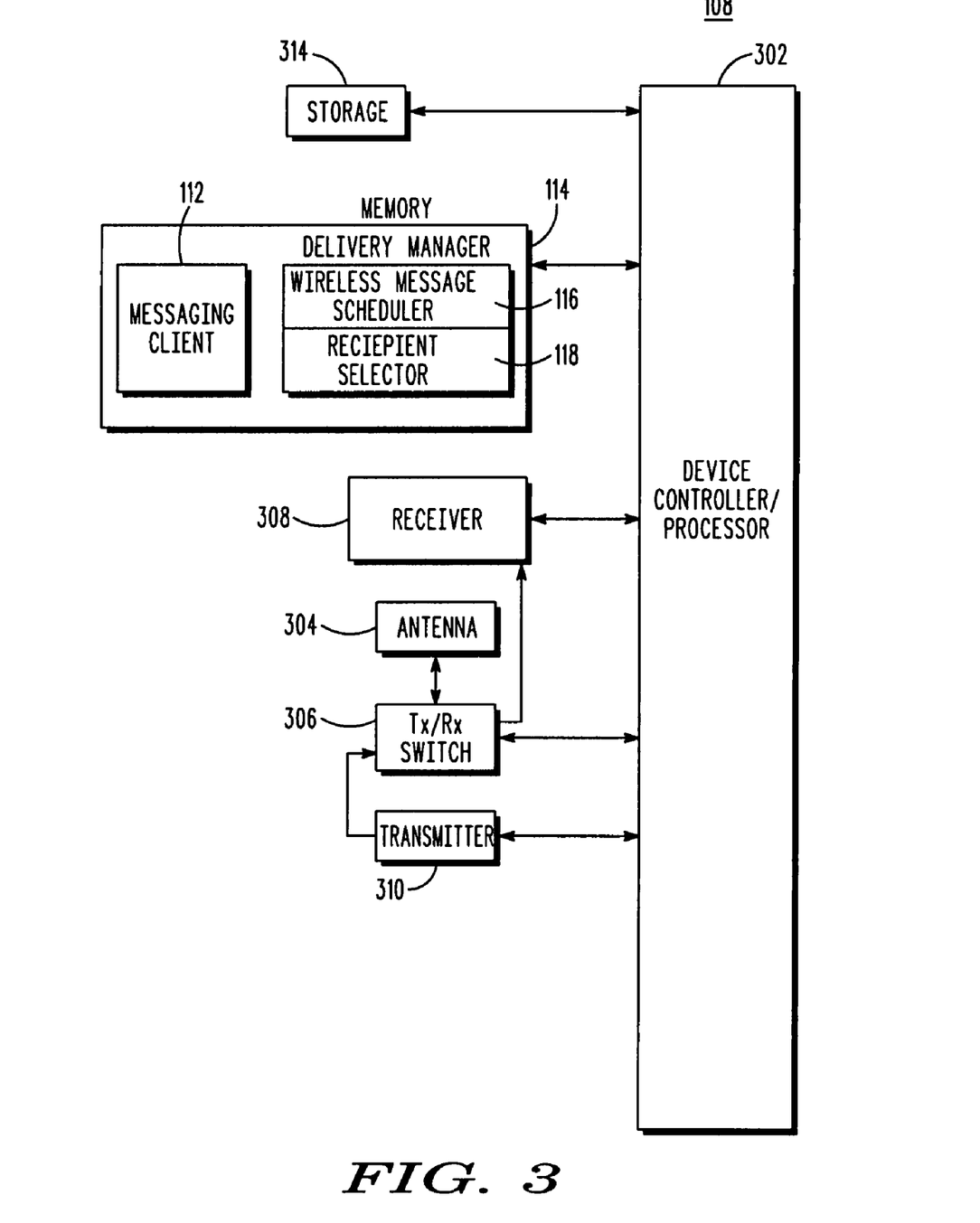
FIG. 3 is a block diagram illustrating a detailed view of a wireless device according to an embodiment of the present invention.

FIG. 3 is a block diagram illustrating a detailed view of the wireless device 104 according to an embodiment of the present invention. It is assumed that the reader is familiar with wireless communication devices. To simplify the present description, only that portion of a wireless communication device that is relevant to the present invention is discussed. The wireless device 104 operates under the control of a device controller/processor 302, that controls sending and receiving wireless communication signals. In receive mode, the device controller 302 electrically couples an antenna 304 through a transmit/receive switch 306 to a receiver 308. The receiver 308 decodes the received signals and provides those decoded signals to the device controller 302.

In transmit mode, the device controller 302 electrically couples the antenna 304, through the transmit/receive switch 306, to a transmitter 310. It should be noted that in one embodiment, the receiver 308 and the transmitter 310 are a dual mode receiver and a dual mode transmitter for receiving/transmitting over various access networks providing different air interface types. In another embodiment, a separate receiver and transmitter is used for each type of air interface.

The device controller 302 operates the transmitter and receiver according to instructions stored in the memory 312. The memory 312, in one embodiment, includes the messaging client 112, delivery manager 114, wireless message scheduler 116, and recipient selector 118. The wireless device 104, also includes non-volatile storage memory 314 for storing, for example, an application waiting to be executed (not shown) on the wireless device 104.

Example of Information Processing System

Figure 4:
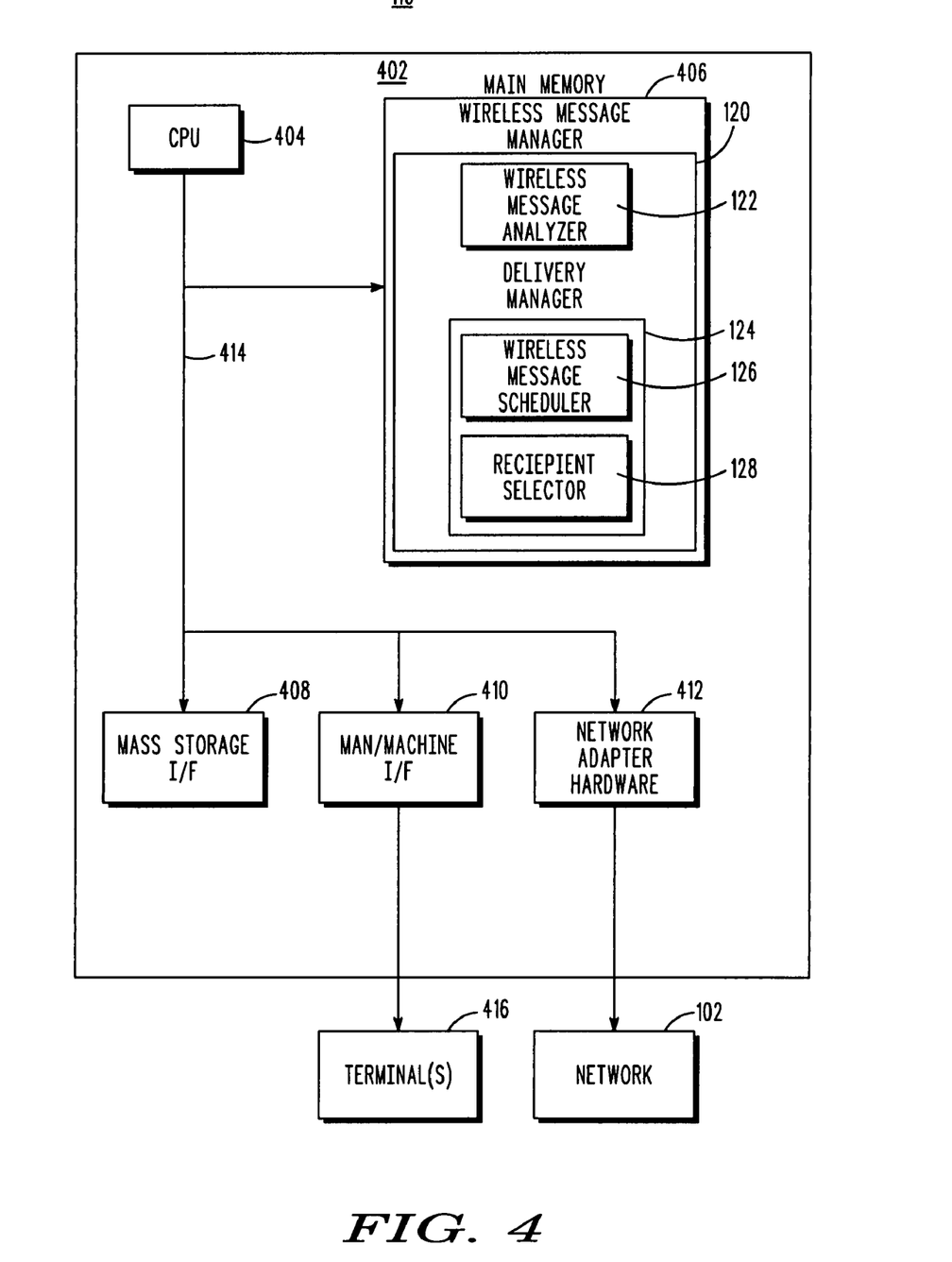
FIG. 4 is a block diagram illustrating a detailed view of an information processing system according to an embodiment of the present invention.

FIG. 4 is a block diagram illustrating a more detailed view of the messaging server 110. The messaging server 110 is based upon a suitably configured processing system adapted to implement the embodiment of the present invention. For example, a personal computer, workstation, or the like, may be used. The messaging server 110 includes a computer 402.

The computer 402 has a processor 404 that is connected to a main memory 406, a mass storage interface 408, a man-machine interface 410, and network adapter hardware 412. A system bus 414 interconnects these system components.

The main memory 406 includes the wireless message manager 120, which includes the wireless message analyzer 122, delivery manager 124, wireless message scheduler 126, and recipient selector 128. Although illustrated as concurrently resident in the main memory 406, it is clear that respective components of the main memory 406 are not required to be completely resident in the main memory 406 at all times or even at the same time. One or more of these components can be implemented as hardware.

The mass storage interface 408 can store data on a hard-drive or media such as a CD. Man-machine interface 410 allows technicians, administrators, and users, to directly connect to the messaging server 110 via one or more terminals 416. The network adapter hardware 412 is used to provide an interface to the wireless communication network 102, to a public network such as the Internet, and/or to another network. Various embodiments of the present invention can be adapted to work with any data communications connections including present day analog and/or digital techniques or via a future networking mechanism.

Overall Process of One Embodiment of The Present Invention

Figure 5:
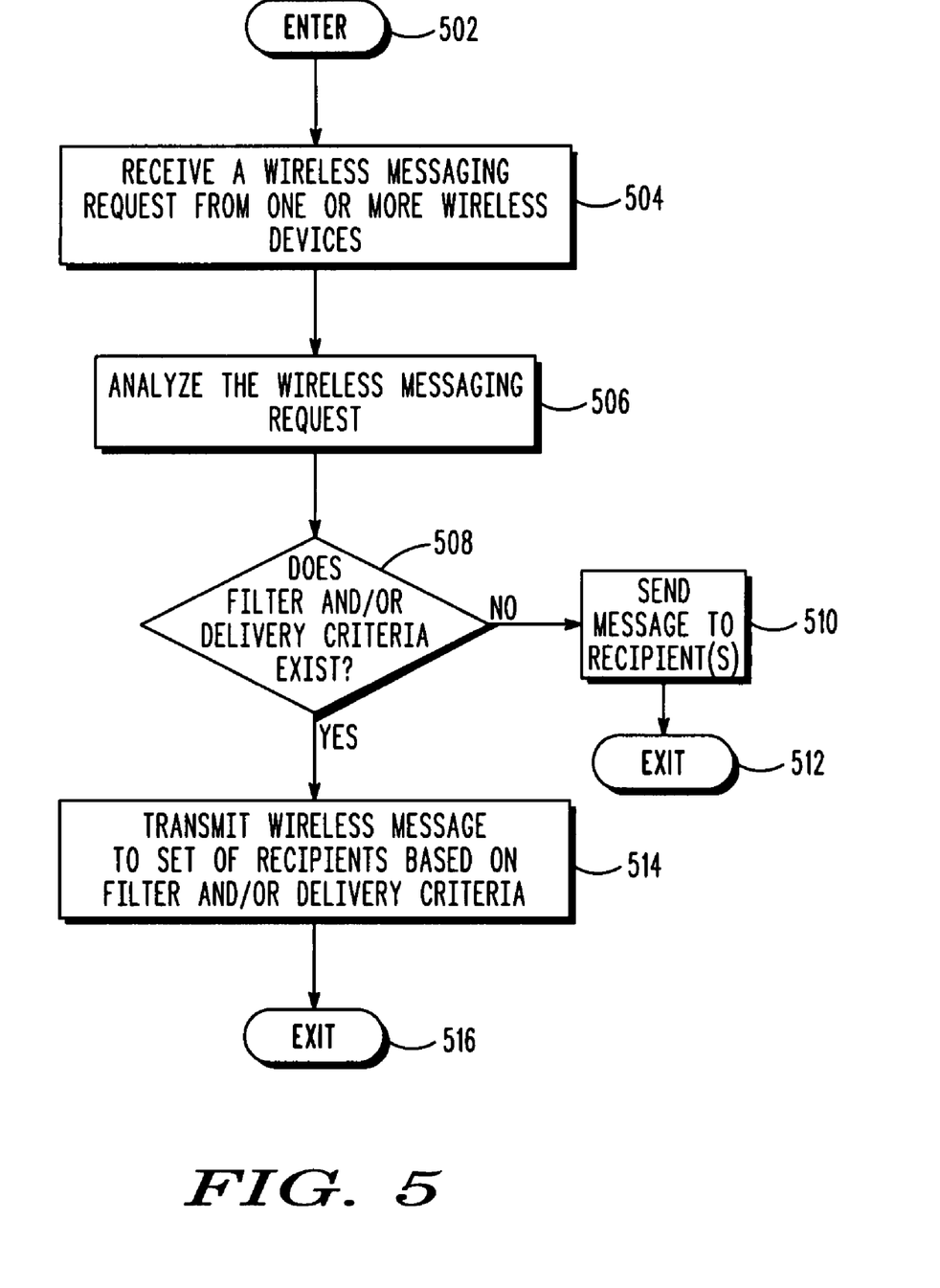
FIG. 5 is an operational flow diagram illustrating an overall process of an embodiment of the present invention.

FIG. 5 is an operational flow diagram illustrating an overall process of one embodiment of the present invention. The operational flow diagram of FIG. 5 begins at step 502 and flows directly to step 504. The messaging server 110, at step 504, receives a wireless messaging request from a wireless device. The wireless messaging request is associated with a wireless message that is to be sent to one or more recipient devices. The messaging server 110, at step 506, analyzes the messaging request. The messaging server 110, at step 508, determines if the wireless messaging request is associated with recipient filter criteria and/or delivery criteria. If the result of this determination is negative, the messaging server 110, at step 510, transmits the wireless message to the recipient device(s). The control flow then exits at step 512. If the result of this determination is positive, the messaging server 110, at step 514, transmits the wireless message to one or more recipients based on the recipient filtering and delivery criteria. The control flow exits at step 516.

Intelligent Delivery of Wireless Messages

Figure 6:
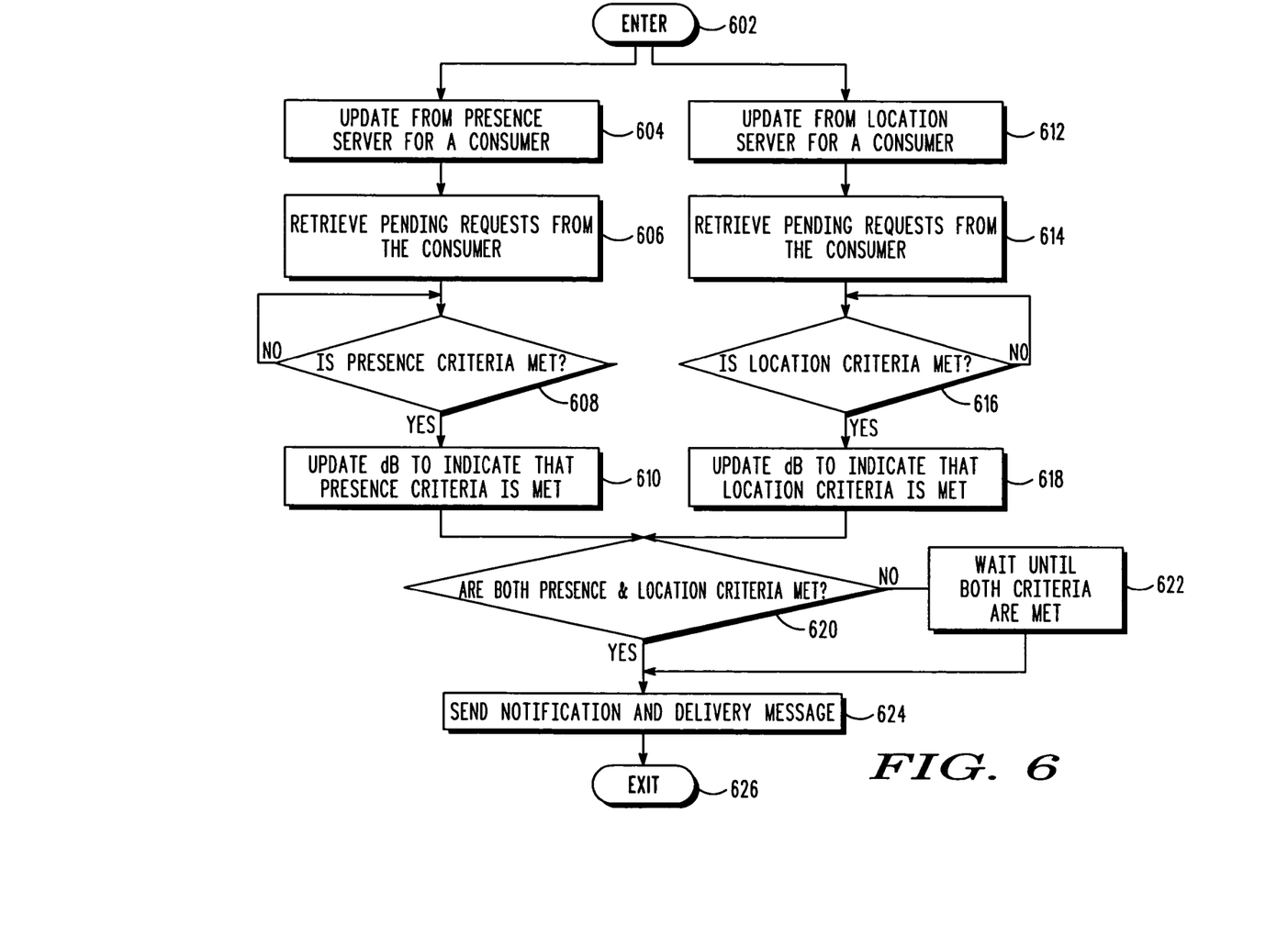
FIG. 6 is an operational flow diagram illustrating a process of transmitting wireless messages to a recipient according to an embodiment of the present invention.

FIG. 6 is an operational flow diagram illustrating a process of intelligently delivering wireless messages to recipients. The operational flow diagram of FIG. 6 begins at step 602 and flows directly to step 604. The messaging server 110, at step 604, receives an update from the presence server 132 associated with a particular wireless device. The messaging server 110, at step 606, retrieves pending wireless messaging requests associated with the particular wireless device. The messaging server 110, at step 608, determines if presence criteria (if any) are met by the wireless device. If the result of this determination is negative, the messaging server 110 continues to monitor the presence information for the wireless device.

If the result of this determination is positive, the messaging server 110, at step 610, updates a messaging database to indicate that the presence criteria for a particular message have been met. The wireless messaging server 110, at step 612, receives an update from the location server 130 associated with a particular wireless device. The messaging server 110, at step 614, retrieves pending wireless messaging requests associated with the particular wireless device. The messaging server 110, at step 616, determines if location criteria (if any) are met by the wireless device. If the result of this determination is negative, the messaging server 110 continues to monitor the location information for the wireless device.

If the result of this determination is positive, the messaging server 110, at step 618, updates a messaging database to indicate that the location criteria for a particular message has been met. The messaging server 110, at step 620, determines if both presence (if any) and location (if any) criteria are met. If the result of this determination is negative, the messaging server 110, at step 622, waits to send the message until the presence and location criteria are met. If the result of this determination is positive, the messaging server 110, at step 624, sends the message to the one or more recipients and sends a delivery notification to the sending device 104. The control flow exits at step 626.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for providing wireless messaging services to wireless devices, the method comprising: receiving a wireless messaging request from a user, wireless the wireless messaging request is associated with at least one recipient device of a plurality of recipient devices;

analyzing, in response to the receiving, the wireless messaging request;

determining, in response to the analyzing, that the wireless messaging request comprises recipient delivery criteria;

transmitting a wireless message associated with the wireless messaging request to the at least one recipient device based on the recipient delivery criteria; wherein the delivery criteria indicates when to deliver the message to the at least one recipient device;

receiving a request to cancel the wireless messaging request from the user:

determining whether the wireless message associated with the wireless messaging request is still pending delivery; and when the wireless message is still pending delivery, canceling the wireless messaging request;

when the wireless message has already been sent to the at least one recipient device, sending a notification to the at least one recipient device that a cancellation request associated with the wireless message has been received.

2. The method of claim 1, wherein the transmitting further comprises:

transmitting the wireless message to each recipient device of the plurality of recipient devices when a presence status associated with each recipient device matches a presence status defined by the delivery criteria.

3. The method of claim 1, wherein the transmitting further comprises:

transmitting the wireless message to each recipient device of the plurality of recipient devices when a location of each recipient device substantially matches a location defined by the delivery criteria.

4. The method of claim 1, further comprising:
transmitting a list comprising recipient devices that the wireless message has been sent to.

5. An information processing system for providing wireless messaging services to wireless devices, the information processing system comprising: a memory; a processor communicatively coupled to the memory; a wireless message manager communicatively coupled to the memory and the processor, wherein the wireless message manager is adapted to: receive a wireless messaging request form a user, wherein the wireless messaging request is associated with at least one recipient device of a plurality of recipient devices;

analyze, in response to the receiving, the wireless messaging request;

determine, in response to the analyzing, that the wireless messaging request comprises recipient delivery criteria;

transmit a wireless message associated with the wireless messaging request to the at least one recipient device based on the recipient delivery criteria; wherein the delivery criteria indicates when to deliver the message to the at least one recipient device;

receive a request to cancel the wireless messaging request from the user;

determine whether the wireless message associated with the wireless messaging request is still pending delivery; and when the wireless message is still pending delivery, cancel the wireless messaging request;

when the wireless message has already been sent to the at least one recipient device, send a notification to the at least one recipient device that a cancellation request associated with the wireless message has been received.

6. The information processing system of claim 5, wherein the transmitting further comprises:

transmitting the wireless message to each recipient device of the plurality of recipient devices when a presence status associated with each recipient device matches a presence status defined by the delivery criteria.

7. The information processing system of claim 5, wherein the transmitting further comprises:

transmitting the wireless message to each recipient device of the plurality of recipient devices when a location of each recipient device substantially matches a location defined by the delivery criteria.

\* \* \* \* \*